United States Patent [19]
Knight et al.

[11] 3,840,857
[45] Oct. 8, 1974

[54] SHAPE RECOGNITION SYSTEMS

[75] Inventors: Adrian Edward Knight, Birmingham; Philip Purssell, Solihull, both of England

[73] Assignee: Joseph Lucas (Electrical) Limited, Birmingham, England

[22] Filed: Nov. 9, 1972

[21] Appl. No.: 305,060

[30] Foreign Application Priority Data

Nov. 16, 1971 Great Britain .................... 53027/71
Feb. 12, 1972 Great Britain ...................... 6680/72

[52] U.S. Cl. ...................... 340/146.3F, 250/223 R, 340/146.3 AC, 340/146.3 MA, 356/168
[51] Int. Cl. ...................... G01n 21/30, G06m 7/00
[58] Field of Search ............. 340/146.3 F, 146.3 H, 340/146.3 MA, 146.3 AC, 146.3 T, 146.3 Y; 250/219 WD, 223 R, 223 B, 220 M; 356/168

[56] References Cited

UNITED STATES PATENTS

| | | | |
|---|---|---|---|
| 3,176,271 | 3/1965 | Mader | 340/146.3 MA |
| 3,197,736 | 7/1965 | Leightner et al. | 340/146.3 MA |
| 3,237,161 | 2/1966 | Rabinow | 340/146.3 T |
| 3,271,576 | 9/1966 | Turner | 340/146.3 F |
| 3,365,699 | 1/1968 | Foster | 340/146.3 F |
| 3,529,169 | 9/1970 | Heaney et al. | 250/223 B |
| 3,549,890 | 12/1970 | Keller | 250/223 B |
| 3,549,896 | 12/1970 | Masino et al. | 250/219 WD |
| 3,618,016 | 11/1971 | Van Steenis | 340/146.3 Y |

*Primary Examiner*—Gareth D. Shaw
*Assistant Examiner*—Leo H. Boudreau

[57] ABSTRACT

A shape recognition system for recognizing articles of a particular shape, the system including a sensing station through which articles to be screened are passed. At the sensing station are a plurality of light sensitive units each of which incorporates a photo-transistor and electric circuitry for selectively determining whether the unit produces an output signal when the respective photo-transistor is illuminated, or alternatively produces an output when the respective photo-transistor is in shadow. Those units masked by the article to be recognized in use can thus be set to produce an output signal when their photo-transistors are in shadow and the remaining units can be set to produce an output signal when their photo-transistors are illuminated. The system further includes a logic unit which receives signals from the light sensitive units, and means, for example a counter, operated by an output signal from the logic unit. The logic unit therefore produces an output signal in accordance with receiving predetermined signals from the light sensitive units and said means perform a function, for example, a counting function, in accordance with recognition or nonrecognition of an article at the sensing station.

6 Claims, 4 Drawing Figures

SHAPE RECOGNITION SYSTEMS

This invention relates to a shape recognition system and has for its object to provide, in a convenient form, a system which can be set to recognise articles of a particular shape.

A system according to the invention includes a sensing station through which articles to be screened are passed, the sensing station including a plurality of light sensitive units each having a light sensitive device and associated means for selectively determining whether the unit produces an output signal when the respective light sensitive device is illuminated, or produces an output signal when the respective light sensitive device is in shadow, so that in use those units masked by the article to be recognised can be set to produce an output signal when their light sensitive devices are in shadow while the remaining units can be set to produce an output signal when their light sensitive devices are illuminated, and, the system further including a logic unit connected to said plurality of light sensitive units, and meansoperable in response to an output signal from the logic unit, the logic unit producing an output signal in accordance with receiving predetermined signals from the light sensitive units and said means performing a function in accordance with recognition or non-recognition of an article at the sensing station.

Preferably said means operable by the logic unit output signal is a counter and an output signal is produced by said logic unit each time a correctly shaped article is present in the sensing station.

Alternatively said means is operated to divert recognised articles passing through the sensing station so as to separate recognised and none recognised articles.

Conveniently the ligh sensitive devices of the units can be spaced from the articles to be screened, and a light transmitting device transmits light from the region of the articles to the light sensitive devices.

Figure 1:
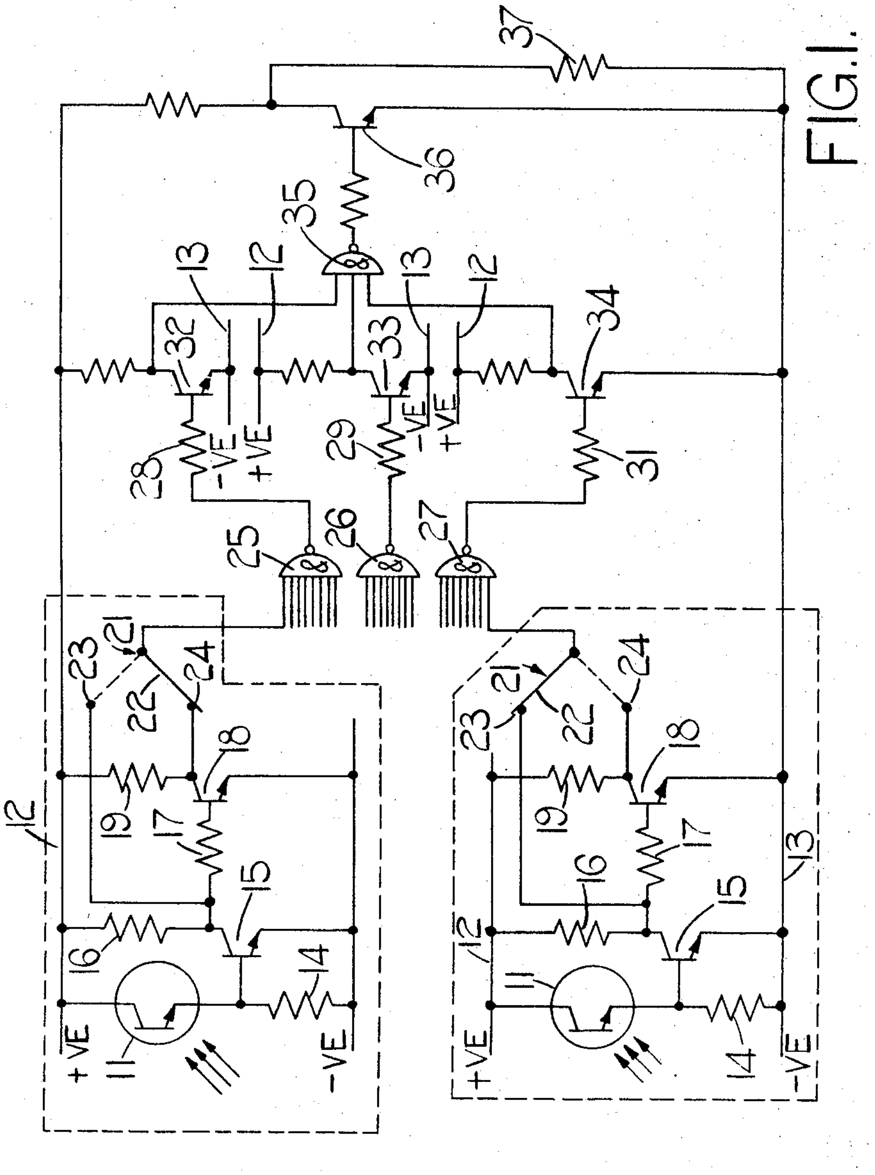
Figures 2, 3:
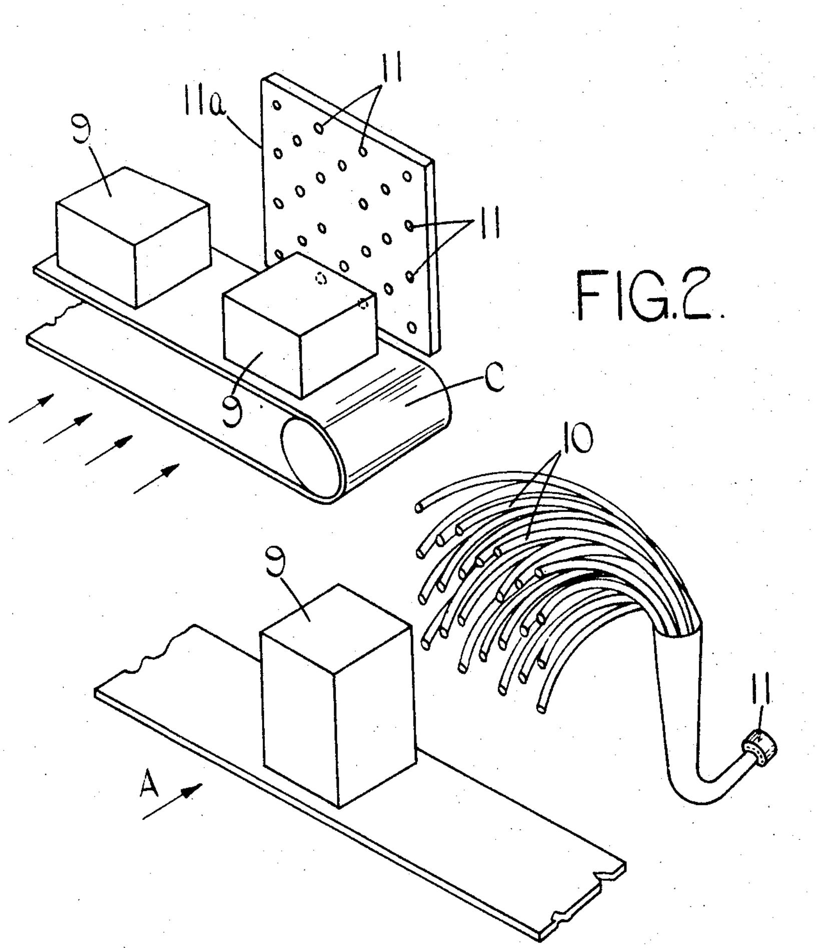
Figure 4:
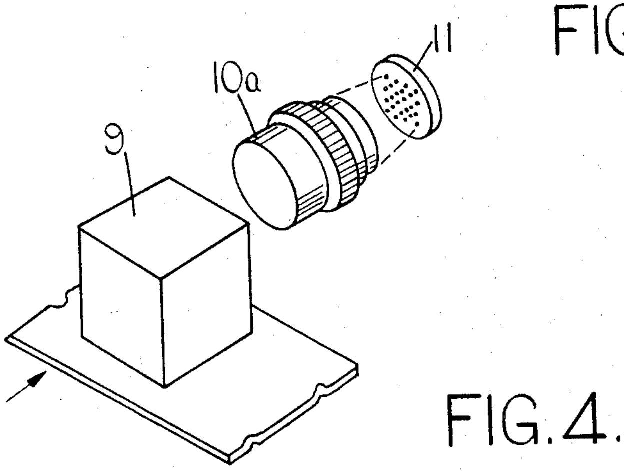

In the accompanying drawings,

FIG. 1 is a diagrammatic representation of a shape recognition system in accordance with one example of the present invention, FIG. 2 is a diagrammatic representation of the sensing station of the system shown in FIG. 1, and FIGS. 3 and 4 are diagrammatic representations of two modifications to the optical arrangement of the sensing station shown in FIG. 2.

Referring to the drawing, the shape recognition system includes a sensing station having a light source and 24 photo transistors 11 spaced from the light source, and capable of being illuminated by the light source. The 24 photo transistors are arranged on a board 11*a* spaced from the light source, and extending between the light source and the board is a conveyor C for carrying components 9 which are to be screened. Each of the photo transistors 11 forms part of a light sensitive unit (two of which are shown within the broken line enclosures in the drawing). The 24 light sensitive units are identical, and so only one will be described. Each light sensitive unit includes positive and negative supply lines 12, 13 respectively the photo transistor having its collector connected to the line 12, and its emitter connected to the line 13 by way of a 150 ohm resistor 14. A conventional n-p-n transistor 15 has its base connected to a point intermediate the resistor 14 and the emitter of the photo transistor 11, its emitter connected to the line 13, and its collector connected to the line 12 through a 470 ohm resistor 16. A point intermediate the resistor 16 and the collector of transistor 15 is connected through an 82 kohm resistor 17 to the base of a further n-p-n transistor 18 the collector of which is connected through a 470 ohm resistor 19 to the line 12, and the emitter of which is connected to the line 13. A manually operable two position switch 21 has a movable contact 22 engageable with either of first and second fixed contacts 23, 24. The fixed contact 23 of switch 21 is connected to the collector of transistor 15, and the fixed contact 24 of switch 21 is connected to the collector of transistor 18. The 24 light sensitive units are arranged for convenience in three groups of 8 units, each group of 8 units having associated therewith an 8 input NAND gate 25, 26, 27. The moving contacts 22 of the switches 21 are connected to respective inputs of their associated NAND gate.

Considering the operation of a single light sensitive unit, when light falls on the photo transistor 11 the photo transistor 11 conducts, and provides base drive to the transistor 15 switching the transistor 15 on. Switching on of transistor 15 diverts base drive from transistor 18, so that transistor 18 switches off thereby raising the potential at contact 24 of switch 21 to a value approaching that of the line 12. With the switch 21 in a first position where the movable contact 22 engages the contact 24, then when light falls on the photo transistor 11 the light sensitive unit will provide an output signal which is applied to one of the inputs of its associated NAND gate. It will be appreciated, that while transistor 15 conducts the potential at contact 23 of switch 21 will have a value approaching that of the line 13. Thus with the switch 21 in a second position where the moving contact 22 engages the fixed contact 23 with light falling on the photo transistor 11, then there is effectively no output signal from the light sensitive unit, and accordingly no signal at the respective input of the associated NAND gate. However, with the switch 21 on its second position, and no light falling on the photo transistor 11, an output signal would be provided to the respective input of the associated NAND gate since the photo-transistor 11 will be non-conductive, and therefore the transistor 15 will be switched off. With the transistor 15 switched off the transistor 18 will be switched on, and so the potential at contact 24 will have a value approaching that of the line 13. Since transistor 15 is not conducting then the potential at the contact 23 of switch 21 will have a value approaching that of the line 12, and so in the second position of the switch 21 an output signal will be provided by the light sensitive unit. It will be appreciated then that each light sensitive unit can be manually set, by moving the switch 21, to provide an output either when light falls on the photo transistor 11, or, in the alternative position of the switch 21 when no light falls on the photo transistor 11.

The outputs of the three NAND gates 25, 26, 27 are connected through respective resistors 28. 29. 31 to the bases of respective transistors 32, 33 and 34. The collectors of the transistors 32, 33 and 34 are each connected through a respective resistor to the line 12 while their emitters are connected to the line 13. Additionally, the collectors of the transistors 32, 33, 34 are connected to respective inputs of a three input NAND gate 35. The output of the NAND gate 35 is connected through a resistor to the base of a further transistor 36 having its collector connected through a resistor to the line 12 and its emitter connected tothe line 13. The collector of the transistor 36 is further connected through a resistor 37 to the line 13, the resistor 37 forming part of an electronic counting device, and having a voltage developed thereacross when the transistor 36 is none conductive.

It will be appreciated that in accordance with the usual operation of a NAND gate when there is a signal at each of the inputs of the NAND gate, then the NAND gate produces no output. Conversely, should any one, or more of the inputs of the NAND gate not receive a signal, then the NAND gate will produce an output. The transistors 32, 33 34 merely serve to invert the signals on the output lines of the NAND gates 25, 26 and 27 so that considering NAND gate 25 when each of its inputs has a signal then there will be no signal on the output of the NAND gate 25 and accordingly the transistor 32 will be non-conductive. Thus the associated input of the NAND gate 35 will be connected to the line 12, and so will receive an input signal. Similar comments of course apply to the NAND gates 26, 27 with their associated transistors 33, 34, and it will be appreciated, that when each of the 24 light units produces an output signal, then the three inputs of the NAND gate 35 will receive a signal, and accordingly the output of the NAND gate 35 will not carry a signal. Thus in that situation the transistor 36 will be switched off, and current will flow in the resistor 37 producing a potential difference between the ends of the resistor 37 and operating the electronic counting device. Should any one of the 24 light sensitive units not produce an output, then the transistor 36 will be switched on since the NAND gate 35 will produce an output, and no current will flow in the resistor 37 and so the counter will not be operative.

In order to set the system to recognise a component of a particular shape, that component is placed before the screen iia carrying the 24 photo transistors 11. The component 9 will be between the photo-transistors and the light source, and so certain of the photo-transistors 11, dependent upon the shape of the component 9, will be in shadow, while the remaining photo-transistors will not be masked from the light source by the component. The switches 21 of the photo-transistors in shadow are then moved to their second positions so that an output signal is produced when the phototransistor is in shadow, while the remaining photo transistors have their associated switches 21 moved to their first positions so that an output is produced when light falls on the respective photo-transistor. Thus when the correctly shaped component is in the correct position in front of the screen carrying the 24 photo-transistors then each of the inputs of the NAND gates 25, 26, 27 will receive a signal, and as described above the counter associated with the resistor 37 will be operated to indicate that a correctly shaped component has passed through the sensing station. The conveyor C carries a stream of components 9 through the sensing station, and it will be appreciated that an incorrectly shaped component will not cause operation of the counter. The components do not, of course, need to be halted in the sensing station since a correctly shaped component moving through the station will during its movement mask momentarily the correct phototransistors.

It is to be appreciated, that the counter could be replaced by some form of warning device, or alternatively could be replaced by an arrangement for diverting incorrectly shaped components from the conveyor.

It will further be appreciated that if a 24 input NAND gate is available, then the 24 input gate can be used to replace the NAND gates 25, 26, 27 and their associated transistors 32, 33, 34, together with the NAND gate 35.

It is envisaged, that in order to improve the accuracy of the system some or all of the photo-transistors can be adjustably mounted, so that their positions relative to one another can be altered, the positions of the photo-transistors being chosen to suit the shape to be recognised. Moreover, for the sake of convenience the photo-transistors can be carried by a screen adjacent the conveyor as described above, with the control, and logic circuitry at a remote point.

In the modification shown in FIG. 3 the articles 9 to be screened are lit from one side by light travelling in the direction of arrow A, and on the opposite side of the conveyor carrying the articles is positioned one end of each of a plurality of optical cables 10. The ends of the optical cables are arranged in a predetermined pattern, and the opposite ends of the cables are each associated with a respective photo-transistor 11 of the shape recognition system. The shape recognition system works in exactly the manner described above with the exception that the photo-transistors 11 are not directly lit, or directly in shadow, but are lit, or in shadow, by virtue of the light conductivity of the optical cables 10. Thus the photo-transistors 11 can be positioned at a point remote from the articles to be screened, and it will be appreciated that this feature is particularly useful where the environment of the articles to be screened would have a dilaterious effect on the photo-transistors.

It will further be appreciated that the ends of the optical cables can be positioned adjacent the articles to be screened, far mor conveniently than can the phototransistors. Additionally, a fixed array of phototransistors can be utilized while the system can have the capability of screening articles of widely differing sizes and shapes. Thus when it is necessary to screen an article of a different size or shape it is merely necessary to move the ends of the optical cables remote from the photo-transistors, the flexibility of the cables making this a very simple procedure.

Referring now to FIG. 4, the basic system is modified in that a lens system 10a is interposed between the articles 9 to be screened, and an array of photo-transistors 11. The lens system is used to optically magnify or reduce the image of the article 9 as required, to suit a convenient pres-assembled array of photo-transistors. This arrangement is of course particularly suitable where the articles to be screened are small, since the maximum closeness of the photo-transistors will be determined by the space needed for their mountings, and their electrical connnections. Thus where a very small article is to be screened, without the provision of means for magnifying the image the accuracy of the shape recognition system would suffer since it would not be possible to mount the photo-transistors sufficiently close to one another.

We claim:

1. A shape recognition system comprising, in combination, a plurality of light sensitive units each of which includes a light sensitive device, the light sensitive devices being arranged in an array at a sensing station through which articles to be screened are passed, and, the system further including a digital logic unit, and means operable in response to an output signal from the digital logic unit, for performing a function in accordance with recognition or non-recognition of an article at the sensing station, each light sensitive unit further including first electrical circuit means having a first output terminal at which a logic signal is produced when the respective light sensitive device is illuminated, second electrical circuit means having a second output terminal at which a logic signal is produced when said respective light sensitive device is in shadow, and switch means connecting either said first terminal, or said second terminal to said logic unit, so that said light sensitive unit can be set, by operation of said switch means, to provide a logic signal to said logic unit either when said respective device is illuminated, or when said device is in shadow, whereby, said plurality of units can be so set that those units whose devices are masked by the article to be recognised have their second output terminal connected to said logic unit, while the remaining units, which will not be masked by the article to be recognised, have their first output terminal connected to the logic unit, the logic unit being such that it produces an output signal in accordance with receiving predetermined signals from the light sensitive units.

2. A system as claimed in claim 1 wherein said means operable by the logic unit output signal is a counter and an output signal is produced by said logic unit each time a correctly shaped article is present in the sensing station.

3. A system as claimed in claim 1 wherein said means operable by the logic unit output signal is operated to divert recognised articles passing through the sensing station so as to separate recognised and non recognised articles.

4. A system as claimed in claim 1 where the light sensitive devices of the light sensitive units are spaced from the articles to be screened, and a light transmitting device transmits light from the region of the articles to the region of the light sensitive devices.

5. A system as claimed in claim 4 wherein the light transmitting device is a plurality of optical cables.

6. A system as claimed in claim 4 wherein the light transmitting device is a lens system.

* * * * *